3,471,438
ASBESTOS COMPOSITION
Stephen Chwastiak, St. Catherines, Ontario, Canada, assignor to Union Carbide Corporation, a corporation of New York
Filed Oct. 24, 1966, Ser. No. 589,116
Int. Cl. C08g 51/12; C08k 1/14
U.S. Cl. 260—40                                              3 Claims

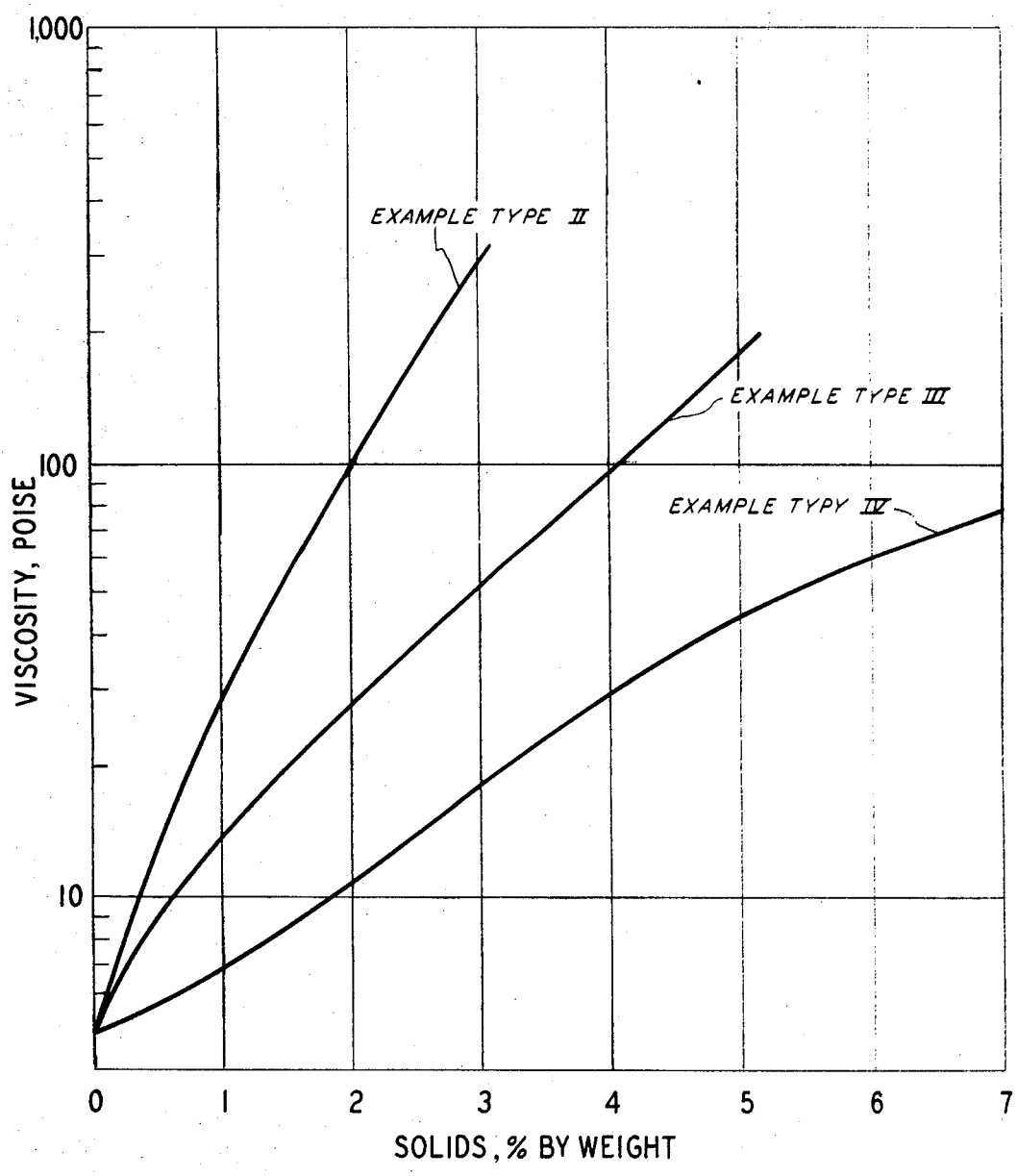

ABSTRACT OF THE DISCLOSURE

A material for thickening polyester resins comprising chrysotile asbestos having a precipitation deposited siliceous outer layer.

---

This invention relates to an asbestos base composition. More particularly, this invention relates to a chrysotile asbestos base material which can be used as a superior and very economical thickening agent and filler for polyester resins.

Chrysotile asbestos, as it naturally occurs, may be generally defined as a hydrous magnesium silicate composition having a layered structure in which the outermost surface is brucite, i.e. magnesium hydroxide. In contact with polar liquids, asbestos exhibits a strong positive charge and thereby attracts anions and thus can be used in removal of detergents from liquids; asbestos, in the natural state, is also highly effective as a flocculating agent for minerals such as titanium dioxide and clays.

However, apparently on account of its unique surface characteristics, natural chrysotile asbestos has not been found to be effective in certain important applications for which it might, at first glance, be thought to be well suited, e.g. in the thickening of polyester resins.

It is, therefore, an object of the present invention to provide a new asbestos base material which can be used as a superior and more economical thickening agent and filler for polyester resins.

It is another object to provide a novel process for making the asbestos base material of this invention.

It is a further object to provide a method of increasing the viscosity of curable polyester resins.

Other objects will be apparent from the following description and claims in combination with the drawing which shows a graph comparatively illustrating the advantages of the material of the present invention as a thickening agent for curable polyester resins.

An asbestos base material in accordance with the present invention comprises particulate chrysotile asbestos having a precipitation deposited siliceous outer layer.

The material of this invention is characterized by a reflectance of about 82 or more as compared to a reflectance of about 76 for natural asbestos and can be used as a superior thickener for polyester resins and also to improve the stiffness of articles made from cured resin containing the material of this invention.

In the practice of a particular embodiment of the present invention, opened [1] particulate chrysotile asbestos is provided, such as that available commercially as High Purity Grade Asbestos from Union Carbide Corporation. This asbestos is slurried with water, the slurry conveniently containing from about 0.5% to 4% by weight asbestos and more suitably about 1–2% asbestos by weight. A predetermined amount of concentrated sodium silicate solution, suitably an amount which provides about 12 parts by weight of $SiO_2$ per 100 parts of asbestos, is added to the slurry followed by neutralization to provide in the slurry a pH of about 9.5 or less. Acetic acid is preferably used as the neutralizing agent. Under these circumstances, i.e. a pH of about 9.5 or less, a siliceous gel is precipitated and this gel adheres to and coats the slurried asbestos which is recovered by filtration techniques and dried to provide a filter cake. This filter cake is characterized by increased whiteness as compared to untreated asbestos as indicated by a reflectance of about 82 or more as indicated above.

The thus produced filter cake is then particulated to achieve approximately the same sized material as the starting asbestos. In this condition, the siliceous coated asbestos base material of this invention has a negative surface charge and can be used as an additive for curable polyester resins using conventional techniques, to provide substantially increased viscosity, shelf life and effective thixotropy.

The following examples will more fully illustrate the present invention.

EXAMPLE I

Short fiber chrysotile asbestos from the Coalinga, Calif. deposit, obtained from Union Carbide Corporation under the designation High Purity Grade and having the properties shown in Table A was added to water in an amount of about 1% by weight.

Table A

| | |
|---|---|
| Specific surface area _____ $m^2$/gm__ | 60–80 |
| Magnetite content _____percent__ | 0.04–0.5 |
| Reflectance _____do____ | 72–78 |

Specific surface area is calculated from adsorption data using the BET (Brunauer, Emmet, Teller) method as described in Brunauer, "The Adsorption of Gases and Vapors," Princeton University Press (1945).

Magnetite content is measured by a permeametric device patterned after ASTM standard method D–1118–57. However, because the lower limit of detection of the ASTM device is only about 0.20% magnetite, the ASTM method has been improved with respect to sensitivity to measure a limit of detection of 0.005% magnetite, and the range extended to measure 0.10% magnetite in the mid-scale of the instrument. In order to obtain this greater range and improved sensitivity, the ASTM method has been modified to detect the phase changes of the current generated when magnetic materials are placed in a transformer core rather than the voltage changes generated.

Reflectance is measured on a sample prepared according to TAPPI (Technical Association of the Pulp and Paper Industry) standard T–452–m–58 and reported as percent of ultimate reflectance based on magnesium oxide as 100% reflectance.

The water-asbestos mixture (25 grams of asbestos in 2.5 liters of water) was introduced into a large Waring Blendor [2] and the blendor was run at its highest speed for about 3 minutes. Following this treatment, sodium silicate (1 M solution) in the amount of 50 milliliters was gradually added to the asbestos-water slurry while slowly stirring the slurry with a mechanical stirrer. This provided in the slurry the equivalent of about 3 grams of $SiO_2$. This mixture was then treated by slowly adding 78 milliliters of acetic acid (1 M) to neutralize the solution and obtain a pH of about 9.5. At this pH, precipitation of siliceous material occurred which was substantially all adsorbed by the slurried asbestos particles and these particles when added to water exhibit a negative charge, as can be demonstrated by standard electrophoresis techniques. On the other hand, untreated as-

---

[1] Opened particulate asbestos refers to particulate asbestos in which the naturally occurring fiber bundles have been separated into their ultimate individual fibers to the extent that most of the constituent particles are in the form of individual fibrils.

[2] Model No. CB-4.

bestos exhibits a strong positive charge under the same circumstances.

After this step the slurry was filtered and a filter cake obtained which, when dried, was characterized by a reflectance of about 76 for untreated asbestos.

The filter cake, after drying at 110° C. for about 4 hours was agitated (dry) in a small Waring Blendor[3] at high speed. The charge to the blendor was 5–6 grams. This material, had a particle sizing corresponding to the original asbestos material.

EXAMPLE II

Eight grams of the material prepared as in Example I, predried at 110° C. for two hours, were mixed with Para Plex[4] P43, a curable polyester resin, to which had been previously added styrene monomer (about 50 milliliters) to achieve a viscosity of about 500 centipoises at room temperatures; the total of Para Plex plus styrene monomer was 400 milliliters. The mixing of the asbestos base material and resin was accomplished using a G. W. Homo-Mixer[5] for about 1 minute.

The viscosity of the material measured at room temperature was measured with a Brookfield LV viscometer. The viscosity obtained is shown in Table I.

EXAMPLE III

Eight grams of untreated short fiber asbestos having the properties shown in Table A were pre-dried and mixed with Para Plex P43 plus styrene monomer following the same procedure as in Example II. The viscosity obtained is shown in Table I.

EXAMPLE IV

Eight grams of Cab-O-Sil[6], a material which is widely used as a commercial thickener for polyester resins, was mixed with Para Plex plus styrene monomer following the same procedure as in Example I. The viscosity obtained is shown in Table I.

TABLE I

| Example | Brookfield Viscosity | | | | | |
|---|---|---|---|---|---|---|
| | Visc., centipoises | Spindle[1] | R.p.m. | Visc., centipoises | Spindle[1] | R.p.m. |
| I, this invention | 18,500 | 4 | 12 | 6,750 | 4 | 60 |
| II, untreated asbestos | 1,075 | 2 | 12 | 970 | 2 | 30 |
| III, Cab-O-Sil | 3,850 | 3 | 12 | 1,800 | 3 | 60 |

[1] Spindle is selected to give convenient scale reading.

The following Table II shows additional viscosity data obtained using Cab-O-Sil and the material of this invention made as in Example I and following the procedures of the foregoing Examples II and III with respect to making additions to polyester resin.

TABLE II.—BROOKFIELD VISCOSITY

| Addition to Resin (Para Plex plus Monomer) | Addition to resin parts per hundred by weight | Viscosity, centipoises | Temp., °C. | R.p.m. | Spindle |
|---|---|---|---|---|---|
| No addition | | 450 | 25 | 6 | 2 |
| This invention | 1.5 | 8,800 | 25 | 6 | 3 |
| Cab-O-Sil | 1.5 | 3,300 | 25 | 6 | 2 |
| This invention | 2 | 23,000 | 25 | 6 | 4 |
| Cab-O-Sil | 2 | 8,000 | 25 | 6 | 4 |
| This invention | 2.5 | 69,000 | 25 | 6 | 4 |
| Cab-O-Sil | 2.5 | 13,500 | 25 | 6 | 4 |
| This invention | 3 | >90,000 | 25 | | 4 |
| Cab-O-Sil | 3 | 22,500 | 25 | 6 | 4 |

In addition to the laboratory scale tests described above, plant scale tests using 400–500 times the amounts of material (e.g. 25 pounds of asbestos instead of 25 grams) were conducted following the procedures of the examples to provide comparative data for the material of this invention, except that in the plant scale tests the neutralizing acid addition was made, in the required amount, prior to the sodium silicate addition. The data for most reacted asbestos and Cab-O-Sil were obtained from laboratory scale tests as previously described. The results are shown in Table III.

TABLE III.—BROOKFIELD VISCOSITY

| Addition to Resin (Para Plex plus Monomer) | Addition to Resin parts per hundred by weight | Viscosity, centipoises | Temp., °C. | R.p.m. | Spindle |
|---|---|---|---|---|---|
| Untreated asbestos | 0.5 | 545 | 25 | 30 | 2 |
| | 1.0 | 690 | 25 | 30 | 2 |
| | 1.5 | 835 | 25 | 30 | 2 |
| | 2.0 | 965 | 25 | 30 | 2 |
| | 3.0 | 1,660 | 25 | 30 | 3 |
| This invention | 0.5 | 880 | 25 | 30 | 2 |
| | 1.0 | 2,360 | 25 | 30 | 3 |
| | 1.5 | 5,600 | 25 | 30 | 4 |
| | 2.0 | 10,200 | 25 | 30 | 4 |
| | 3.0 | | | | |
| Cab-O-Sil | 0.5 | 455 | 25 | 30 | 2 |
| | 1.0 | 1,230 | 25 | 30 | 3 |
| | 1.5 | 1,800 | 25 | 20 | 3 |
| | 2.0 | 2,400 | 25 | 30 | 3 |
| | 3.0 | 5,400 | 25 | 30 | 4 |

The graph of the figure of the drawing shows a comparison, based on the average of actual viscosity data, between the material of this invention, (Example I type), untreated asbestos (Example III type) and Cab-O-Sil (Example IV type) and further illustrates the effectiveness of the present invention as a thickening agent.

[3] Model No. LB-1.
[4] Trademark of Rohm & Haas Co. for synthetic unsaturated polyesters that are polymerizable to cross-linked structures.
[5] Model 1-S, Lamb Electric Co.
[6] Trademark of Godfrey L. Cabot Inc. for colloidal silica useful as a thickening agent.

To further illustrate the present invention, the procedure of Examples I and II were followed except that (1) ten grams of the asbestos base composition of this invention were mixed with Para Plex plus monomer, instead of the 8 grams used in Example II; (2) mixing in the Homo-Mixer was conducted for 3 minutes instead of 1 minute of mixing as in Example II and (3) the amount of sodium silicate addition described in Example 1 were varied so as to determine the effect of this variation on the resultant product.

The viscosities measured at 25° C. using a Brookfield LV viscometer at speeds of 6 r.p.m. and for spindles 2–4 (selected to obtain approximately mid-scale readings) are shown in Table IV.

Table IV

Sodium silicate added as parts
$SiO_2$ per 100 parts asbestos:   Viscosity-centipoises

| | |
|---|---|
| 0.5 | 1750 |
| 1.2 | 3000 |
| 2.5 | 6000 |
| 3.7 | 8000 |
| 7.5 | 40,000 |
| 12.5 | 60,000 |
| 25 | 80,000 |

The data of Table IV and other data, have shown that to provide an asbestos base polyester thickening agent in accordance with this invention, enough sodium silicate solution, or other suitable solution, should be provided so that at least 0.5 part of $SiO_2$ are added for each 100 parts of asbestos in the slurry; at least 6 parts of $SiO_2$ per 100 parts of asbestos is preferred, and the preferred range being 6 to 25.

Also, to provide effective thickening in polyester resins, the addition of the siliceous coated material of this invention should be at least about 0.5% by weight of resin as indicated in the previous tabulated data and a suitable range is from 0.5 to 3%; the preferred range of addition is from 0.5% to 2%.

By way of illustrating the mechanism by which the material of this invention is produced, a series of additional tests was conducted using in each instance a slurry of 1.0 gram of asbestos in distilled water. A slurry without any sodium silicate addition was used as the basis for comparison (1) with a slurry to which sodium silicate was added and (2) with a slurry containing added sodium silicate which was subsequently neutralized with acetic acid. The results are shown in Table V.

for use in significantly increasing the viscosity of polyester resins.

While the foregoing description has been mainly directed to the use of particular materials the present invention contemplates the use of other materials, in place of sodium silicate, which can be treated to precipitate a silica gel, e.g. $SiCl_4$ and silicic acid. Also, in place of acetic acid as the neutralizing agent, inorganic acids such as HCl, $HNO_3$ and $H_2SO_4$ can be used and also formic, propionic and butyric acid can be used.

In general, all polyester resins to which inert mineral fillers have been added, or to which inert mineral fillers can be added, can be used with additions of the asbestos base product of this invention. Unsaturated cross-linkable polyester resins, liquid at room temperature, which on curing result in cross-linking among the individual linear polymer chains, without the formation of a by-product during the curing reaction, are readily thickened by use of additions of the asbestos base material of this invention. The final, i.e. cured products of these materials are variously known in the art as polyester resins, contact resins (because of the low molding pressure needed) and low pressure laminating resins.

Polyester resins having additions of asbestos base material of this invention can be conventionally cast, molded, sprayed and applied with brushes in the same manner as resins without additions. The cured product provided by casting or molding of resins having additions in accordance with this invention have increased flexural modulus and other improved properties, while resins used for brushing applications, having additions in accordance with this invention, have improved effective thixotropy.

What is claimed is:

1. In a process for thickening polyester resins by the addition thereto of a particulate solid material, the improvement which comprises employing, as the particulate solid material, between 0.5 and 3 percent by weight of chrysotile asbestos having a precipitation deposited siliceous coating, said siliceous coating being not more than 25% by weight of the asbestos.

2. An asbestos base material comprising opened chrysolite asbestos having a precipitation deposited siliceous outer layer which is not more than 25% by weight of the asbestos.

3. A process for making an asbestos base material suitable for use as a thickening agent in polyester resins which comprises open particulate:
   (1) providing an aqueous slurry of opened chrysotile asbestos
   (2) providing in mixture with the slurry a solution of a material capable of precipitating a silica gel
   (3) treating the mixture of slurry and solution with a

TABLE V

| | | Addition | | Filtrate assay $SiO_2/g$. per l. | $SiO_2$ on asbestos[2], gram | Surface[3] charge |
|---|---|---|---|---|---|---|
| Test | Treatment [1] | $Na_2SiO_3$, millimoles | $SiO_2$ equiv., grams | | | |
| Blank | 1 gram of asbestos slurried in 100 ml. of water, pH 9.2. | 0 | 0 | <0.005 | 0 | + |
| $Na_2SiO_3$ addition | 0.12 gram of $SiO_2$ added as $Na_2SiO_3$ addition, pH 12.1. | 2 | 0.12 | 0.99 | 0.021 | + |
| $Na_2SiO_3$ addition plus neutralization | 0.12 gram of $SiO_2$ added as $Na_2SiO_3$ addition; acetic acid added to pH 9.5. | 2 | 0.12 | 0.50 | 0.070 | — |

[1] Data are for 1.0 g. asbestos in 100 ml. distilled water.
[2] Calculated by difference.
[3] Sample washed to neutral pH before measurement.

The data of the foregoing Table V show that when sodium silicate is added to a slurry of asbestos in water, significant recovery of siliceous material in the asbestos occurs sufficient to provide a negative surface charge only after neutralization of the slurry to pH 9.5. It has also been found that at least about 4 parts by weight of $SiO_2$ per hundred parts of asbestos should be loaded on the asbestos to provide a negatively charged material suitable neutralizing agent at substantially room temperature in an amount sufficient to provide a pH of about 9.5 or less in the slurry solution mixture to thereby cause precipitation of siliceous material in an amount not more than 25% by weight of the asbestos onto the asbestos in the slurry and
   (4) recovering the asbestos material from the slurry.

(References on following page)

References Cited

UNITED STATES PATENTS 2,885,366   5/1959   Iler.
3,278,479   10/1966  Ferrigno _____ 260—40

MORRIS LIEBMAN, Primary Examiner
R. BARON, Assistant Examiner

U.S. Cl. X.R.

106—308